United States Patent
Petterson

[11] 3,974,994
[45] Aug. 17, 1976

[54] UNIVERSALLY ADJUSTABLE HOUSING APPARATUS

[75] Inventor: Carl Petterson, Vasteras, Sweden

[73] Assignee: Rema Electronic Ltd., Vasteras, Sweden

[22] Filed: Nov. 27, 1974

[21] Appl. No.: 527,862

[30] Foreign Application Priority Data
Nov. 28, 1973 Sweden .................. 7316044

[52] U.S. Cl. .................. 248/23; 248/181
[51] Int. Cl.² .................. F16F 15/00; F16M 11/14
[58] Field of Search .................. 248/23, 178–182, 248/133, 288, 481; 403/90, 122, 124–127, 141–143

[56] References Cited
UNITED STATES PATENTS

| 464,384 | 12/1891 | Osborne | 248/181 |
|---|---|---|---|
| 1,349,002 | 8/1920 | Lakin | 403/125 |
| 1,762,388 | 6/1930 | Everett | 248/288 X |
| 2,123,125 | 7/1938 | Trippe | 248/288 X |
| 2,439,194 | 4/1948 | Wild | 248/181 |
| 3,206,853 | 9/1965 | Esumi et al. | 248/181 X |
| 3,843,083 | 10/1974 | Angiband | 403/90 X |

FOREIGN PATENTS OR APPLICATIONS

| 260,247 | 7/1965 | Australia | 403/122 |
| 1,241,623 | 4/1960 | France | 403/90 |
| 186,422 | 9/1936 | Switzerland | 248/288 |
| 214,932 | 5/1941 | Switzerland | 248/180 |

*Primary Examiner*—Lawrence J. Staab
*Attorney, Agent, or Firm*—Haseltine, Lake & Waters

[57] ABSTRACT

A hollow housing having a spherically curved surface adjustably mounted on a hollow socket, particularly for a device with an adjustable functional axis such as a photo-cell or the like. On the bottom wall of the housing is a first guide region in the form of a first continuous or interrupted spherical-segment-surface, and on the socket is a second guide region cooperatively mating with the first guide region and having the form of a second continuous or interrupted spherical-segment-surface. In the center of one of the guide regions there is mounted a bolt and the other guide region has in its central zone an opening greater than the diameter of the bolt to provide sufficient radial play for the adjustment. A washer is mounted on the bolt such that when the bolt is tightened, the washer is pressed against a contact surface bordering the large opening.

6 Claims, 3 Drawing Figures

UNIVERSALLY ADJUSTABLE HOUSING APPARATUS

FIELD OF THE INVENTION

The invention relates to a housing having a spherically curved surface which can be mounted in adjustable manner on a socket means and which is particularly intended to contain a device with an adjustable or alignable functional axis such as a photo-cell or the like, said device being required to be exactly aligned or adjusted in several directions relative a base, and then secured in the adjusted position.

PRIOR ART

A tripod with a pivotable table is known (Swiss patent specification 236,609) wherein the tripod head is constructed in the form of a hollow body which at its upper and lower limit faces is provided with spherically curved surfaces cambered in opposite directions. This arrangement allows alignment of the functional axis of a device placed on the table, but is itself so bulky, particularly in the height dimension, that it cannot be used in narrow space conditions and the like. Furthermore, extra space is always needed beneath the hollow body for the installation of and access to a clamping screw and its securing nut.

SUMMARY OF THE INVENTION

An object of the present invention is to provide a space saving apparatus for alignable or adjustable mounting of a device on a socket means.

It is also an object of the present invention to provide apparatus for use in such cases as when a photo-cell is to be mounted on a door frame or the like, where access to the fixation element from behind, is not possible as with the clamping screw in the known tripod.

It is a further object of the invention to make the clamping element, if desired, not directly accessible from outside the device, so that the risk of misalignment of the apparatus is thus considerably reduced. The clamping and releasing of the aligned or adjusted position of the device if desired, can be operable either by means of conventional tools such as wrenches, which are common, or only by the use of special tools which in their capacity as "keys" for the adjustment are under the control of only a few persons.

According to the present invention, there is provided on the outer face of one wall, e.g. the bottom wall, or a housing, a first guide region having a continuous or interrupted spherical surface and on the socket means a second guide region cooperating with the first guide region and having a second continuous or interrupted spherical surface. In the center of one of the guide regions there is mounted a clamping means such as a bolt, or an opening through which such bolt can pass, the other guide region having in its center an opening greater than the diameter of the bolt to provide sufficient radial clearance for sliding adjustment of the surfaces on one another. The clamping means is provided with or cooperates with an abutment surface, e.g. a washer on the bolt which is pressed against a contact surface when the bolt is tightened. Preferably, the abutment surface is also of spherical shape.

The bolt may be firmly anchored in the socket and the opening of greater diameter may be provided in the housing. In this case the adjustment is made, when the housing is open, by tightening a nut screwed on the bolt inside the housing, whereupon the housing is closed by putting on its cover. Preferably, however, the socket may provide access under its guide region for an operating device, such as a wrench or the like, to a nut threaded on the bolt. The access may be achieved by means of an elongated opening in the socket. In this case the bolt is fixed in the housing, the nut is screwed on from below and tightened either by means of a conventional or a special wrench which is inserted through the elongated opening.

The guide regions may be formed either as continuous spherical surfaces, i.e. a complete spherical segment, or only as parts of such spherical segments, e.g. three or more star or cross-like disposed ribs with spherical profile, such that their peripheral faces cooperatively form a hypothetical envelope surface in the shape of a spherical segment. Preferably, even if not necessarily, at least one of the guide regions however is made in the form of continuous spherical surface, i.e. as a complete spherical segment.

In principle, it is arbitrary if the guiding regions are inwardly or outwardly cambered inside the housing. In a preferred embodiment, the spherical segment surfaces are convex on the housing and concave in the socket, which, among other things, allows the bolt to be seated inside the housing in such a way that its head doesn't take up any normal internal space of the housing, since it can be accommodated within the hollow formed in the housing by the convex portion.

To enable arbitrary use of the housing according to the invention with such apparatus which itself is mounted adjustably, or not, it is preferable to provide for the possibility of alternative firm mounting of the housing on a base. In the embodiment with a convex outward guide region on the housing, the housing can preferably be provided with at least two protrusions (or one elongated), the free edges of which lie in a plane which passes beyond the outermost point on the convex guide region.

The fixation to a base can then be effectuated in any conventional manner, or also by means of the clamping bolt as a fixing means. It is obvious that a guide region either may be directly built-in in a surface of the respective machine or construction which thus forms or replaces any separate socket means, or it may be formed on a special mount, the socket means proper, which in turn is fixed at the machine etc. Other features and advantages of the apparatus in accordance with the present invention will be better understood as described in the following specification in conjunction with the annexed drawings.

DETAILED DESCRIPTION

Figure 1:
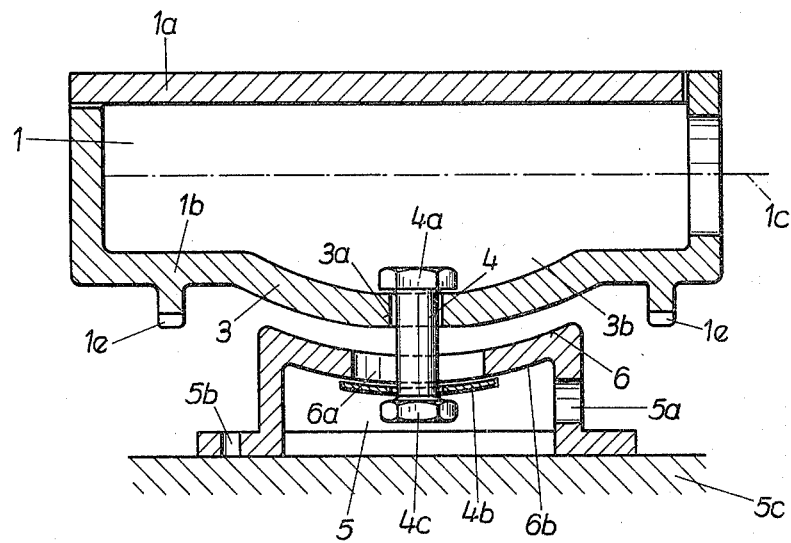
FIG. 1 is a section, in exploded view, through a housing according to the invention.

Referring to FIG. 1, therein is seen a hollow housing 1 provided with a cover 1a, fastened in conventional manner thereto, and with a bottom 1b. Inside the housing 1 is placed a device such as a photo-cell, or the like, (not shown) whose functional axis 1c is to be carefully adjusted before the apparatus is placed in use.

The bottom 1b of the housing 1 is provided with an outwardly cambered or convex guide region 3 in the form of an external bulge in the shape of a spherical segment. In the central part of guide region 3 is an opening 3a for a bolt 4. The head 4a of the bolt 4 is seated in the concave depression 3b which is formed inside the housing 1 by the external convex bulge 3 on the bottom 1b.

Bolt 4 is secured in any conventional manner (not shown) against rotation around its axis, e.g. by forming the opening 3a as well as the shank of the bolt with non-circular cross-sections. The housing 1 is mounted on a hollow socket 5 is the upper part of which is a concave guide region 6 which corresponds to the convex guide region 3 on housing 1. As a consequence of the mating of the curved guide regions, the housing can be universally adjusted on the socket to adjust the position of the axis 1c. In the central part of guide region 6 is an opening 6a which is larger than opening 3a and larger than the diameter of the bolt 4. Mounted on bolt 4 is a washer 4b which is somewhat larger than the opening 6a, and a nut 4c is screwed on the end of bolt 4. The washer 4b rests with its upper surface on a contact surface 6b, shown essentially concentric with surface 6. It is however apparent to one skilled in the art that neither washer 4b nor, the contact face 6b necessarily need be spherical, particularly when only minor adjustment movements are contemplated. In the lateral wall of socket 6a, beneath the concave region 6, is a longitudinal opening 5a through which it is possible to engage nut 4c with a wrench, or the like, to release or to tighten nut 4c on bolt 4.

The nut 4c may also be provided with an unconventional shape so that it cannot be operated by a normal wrench, but only by means of a special tool.

Figure 2:
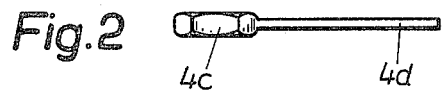
FIG. 2 shows an alternative embodiment of a nut for a clamping bolt.

Alternatively, the nut 4c may be provided with a short lever 4d as seen in FIG. 2 which protrudes through opening 5a and thus forms a permanent operating means. It is, however, apparent that bolt 4 also can be tightened by other means than the use of a screw thread, i.e. it need not be a threaded bolt at all. A rotatable cam surface is one such alternate tightening means.

Socket 5 is fixed in conventional manner to a base surface 5c, such as by means of screws passing through openings 5b.

Instead of using a particular washer 4b, nut 4c itself may obviously be provided, at its periphery with an integral protruding portion extending beyond the periphery of the opening 6a and thus form an abutment surface.

It is clearly evident that the concave guide of the socket can be convex in which case the guide region of the housing will be concave and the larger opening 6a can be arranged in the housing 1 and the smaller opening in the socket 5. The arrangement in FIG. 1 may thus be considered as being inverted and the configuration of socket 5 taken for the housing and the housing for the socket. Also bolt 4 may be (irrespectively of how the guide regions and the openings are disposed) turned upside down from the position shown in FIG. 1. The tightening can in either case also be executed from above, i.e. from the inside of the housing, when the apparatus itself is so constructed that the relative position of region 3 and the apparatus is chosen in such a way, that access to bolt 4 is afforded when cover 1a is taken off.

To enable the use of the same housing for apparatus which, for example, in dependance of from-case-to-case exigencies are to be mounted either adjustably or not-adjustably, protrusions 1e are arranged substantially at the four corners of the bottom 1b of the housing. The free edges of the protrusions lie in a plane which passes beyond the outermost point on the guide region 3a. It is, however, evident that only three protrusions can be used for a support of the housing, or two or even one elongated protrusion can be used in combination with the top of the guide region as a three-point bearing for the housing.

Figure 3:
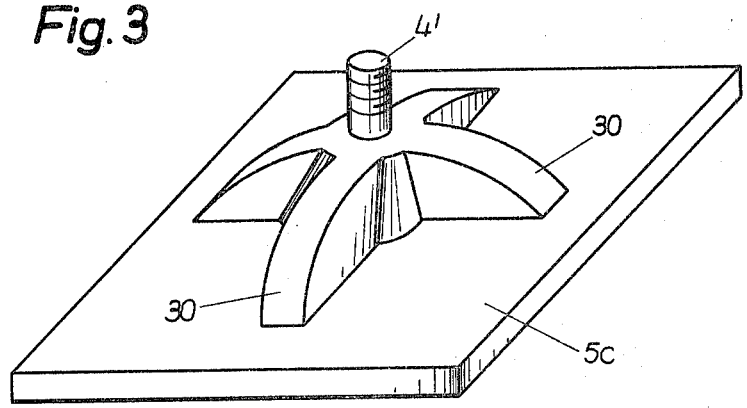
FIG. 3 is a perspective view of a alternative embodiment of a guide section.

In FIG. 3, there is shown an alternative embodiment of a guide region according to the invention. Therein, four ribs 30 are disposed cross-like on a surface 5c which may be either part of the housing 1 or part of the socket means 5. Fixed in the middle of the ribs 30 is a screw bolt 4'. The concave guide region may be constructed in a similar way. The number of the ribs may be greater or smaller than as shown. A guide region of this type can be fabricated simultaneously with the respective flat surface, e.g. by casting or extruding and the like. In this embodiment, the ribs form a solid body in which the bolt 4' is fixed.

What is claimed is:

1. Apparatus comprising a hollow housing having a top wall, a front wall, a bottom wall and side-walls and adapted for containing a device having a functional axis, a socket means for supporting said housing for universal adjustment and locking means for securing the housing and socket means in adjusted position comprising a fastener bolt with a nut threaded thereon, at least one of said walls other than the front wall being planar, said one planar wall and said socket means having respective mating surfaces in the form of spherical segments, the mating surface on the housing being convex outwards and the mating surface on the socket means being concave inwards, said fastener bolt protruding centrally from the convex mating surface at right angles thereto, the concave mating surface having a circular opening the periphery of which is concentric with the periphery of the respective spherical segment surface, said fastener bolt passing with radial clearance through said concentric opening to enable adjustment of the relative position of the housing and socket means in equal extent in all directions, and retaining means larger in diameter than said concentric opening bearing in locked position against the back surface of the socket means at said concentric opening, said housing including at least one outwardly projecting protrusion having a free edge extending beyond the vertex of the convex mating surface on the housing for alternative stable mounting of the housing on a base.

2. Apparatus as claimed in claim 1 wherein said mating surface from which the fastener protrudes is also provided with a central opening through which the fastener passes.

3. Apparatus as claimed in claim 1 wherein said socket means is provided with an additional side opening furnishing access to said nut.

4. Apparatus as claimed in claim 3 wherein said nut includes an integral extension which is accessible through said additional side opening.

5. Apparatus as claimed in claim 1 wherein said retaining means comprises a curved element having the same curvature as said concave surface.

6. Apparatus as claimed in claim 2 wherein said bolt has a head confined in the inner recess formed in the convex surface on the housing.

* * * * *